Sept. 25, 1962 — E. W. WORK — 3,055,589
PRESSURE BALANCED CONDITION RESPONSIVE VALVE
Filed Dec. 11, 1958

INVENTOR.
ERICH W. WORK
BY
Lindsey and Prutzman
ATTORNEYS

United States Patent Office 3,055,589
Patented Sept. 25, 1962

3,055,589
PRESSURE BALANCED CONDITION RESPONSIVE VALVE
Erich W. Work, New Britain, Conn., assignor to Beaton & Cadwell Mfg. Co., New Britain, Conn., a corporation of Connecticut
Filed Dec. 11, 1958, Ser. No. 779,764
12 Claims. (Cl. 236—92)

This invention relates to automatically operable valves and more particularly to an improved valve construction that is operable in response to either temperature or pressure.

It is a primary object of this invention to provide a pressure compensated, thermostatically operable valve.

It is a further object of this invention to provide a valve having independently operable pressure sensitive and temperature sensitive operating mechanisms.

It is an additional object of this invention to provide an improved pressure and temperature sensitive valve utilizing an operating mechanism that permits greatly reduced size for a given rating and which exhibits greater reliability and life expectancy.

It is a still further object of this invention to provide a thermo-motor for a temperature sensitive valve having improved durability and reliability while at the same time being easily adjustable to different operating ranges.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
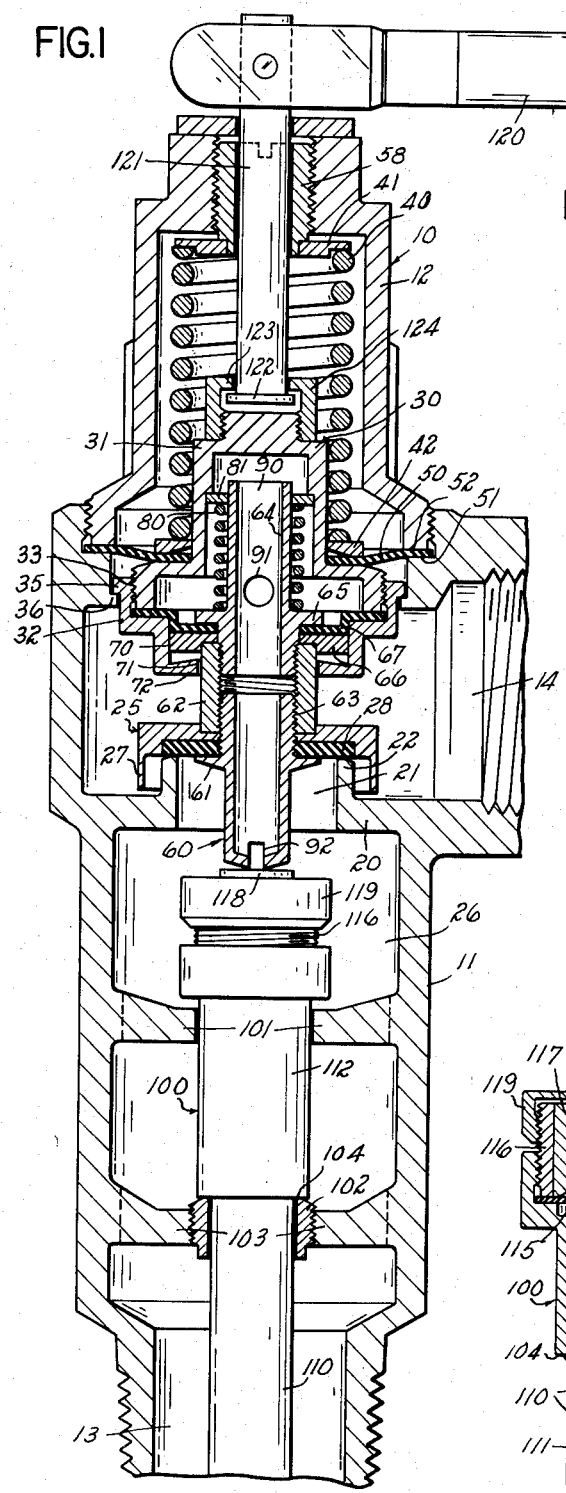
FIG. 1 is a vertical cross section view of a preferred embodiment of the invention.

Refering to FIG. 1, it is seen that a valve constructed in accordance with this invention includes a housing 10 having a base portion 11 and a top portion 12. Base portion 11 is provided with an inlet passageway 13 and an outlet passageway 14, each being adapted for connection to suitable fluid conductors in accordance with the function that the valve is to perform in the associated fluid system. Base portion 11 is also provided with a wall 20, positioned between the inlet and outlet passageways, having a central aperture 21 and a raised lip or valve seat 22 which cooperates with valve member 25 to open and close the internal passageway 26 between inlet passage 13 and outlet passage 14. Valve member 25 is provided with a downwardly extending peripheral skirt 27 and a fiber or other composition washer 28, the washer being positioned to engage valve seat 22 to effect a fluid seal.

The mechanism for moving valve member 25 in response to inlet pressure includes a pressure chamber 30 having a top 31 and a bottom 32 that are in threaded engagement with each other at 33 so as to form a unitary structure. Bottom 32 is provided with a radial lip or rim 35 which normally rests upon annular shoulder 36 extending inwardly from base portion 11. The force to oppose movement of pressure chamber 30 by the inlet fluid pressure is supplied by main spring 40 which acts between washer 41 (and top housing portion 12) and washer 42 to urge pressure chamber 30 into the normal position. Flexible diaphragm 50 has its inner edge clamped between washer 42 and upper housing 31 of pressure chamber 30 and its outer periphery clamped between rim 51 of base portion 11 and the lower face 52 of upper member 12 so as to prevent the escape of any fluid within the lower regions of the valve into top portion 12. Adjustment of spring pressure of washer 41 upon pressure chamber 30 is provided by the stud 58 which threadably engages the sidewalls of top portion 12 and abuts washer 41. As stud 58 is rotated towards valve seat 22, the force exerted by main spring 40 upon washer 42 and pressure chamber 30 is increased.

Movement of valve member 25 to effect opening and closing of aperture 21 is accomplished by exerting appropriate forces upon valve stem or stud 60 which is fixedly attached to valve member 25 by the clamping engagement of annular shoulder 61 with washer 28 and the engagement of collar 62, which is threadably attached to lower stem section 63, with the back of valve member 25. Upper portion 64 of valve stem 60 is secured to lower portion 63 by its threaded engagement with collar 62 and is provided with an outwardly extending shoulder 65 so that backing plate 66 and diaphragm 67 are securely clamped between the upper face of collar 62 and the lower face of shoulder 65. It is intended that the term valve stem designated by the numeral 60 include the backing plate 66 as a structural element. Backing plate 66 is dimensioned to slidably engage sidewall 70 of lower pressure chamber portion 32 and collar 62 is dimensioned to slidably engage sidewall 71 of inwardly directed lip 72 of lower pressure chamber 32. Valve stem 60 and therefore valve member 25 are urged toward valve seat 22 by coil spring 80 which acts between the washer 81 (engaging upper portion 31 of pressure chamber 30) and shoulder 65 of valve stem 60.

As is apparent from the drawings, the force of adjustable main spring 40 is exerted only upon pressure chamber 31 and is fully absorbed by lower housing member 11 through the engagement of pressure chamber rim 35 with lower housing shoulder 36. Valve member 25 and washer 28 are urged into engagement with valve seat 22 only by the force of spring 80 which acts upon valve stem 60 to slide collar 62 and backing plate 66 relative to pressure chamber lip 72 and pressure chamber sidewalls 70. Diaphragm 67 is made of any suitable flexible and impervious material which will permit relative movement between valve stem 60 and pressure chamber 30 as hereinafter explained.

Communication between pressure chamber 30 and the fluid in inlet passage 13 and chamber 26 is provided by the central axial opening 90 that extends substantially throughout valve stem 60. Sidewall opening 91 and top opening 90 are fully within pressure chamber 30 and above diaphragm 67. Slot 92 at the lower end of valve stem 60 is below valve member 25 and is of sufficient size to permit rapid communication of changes of pressure in the inlet side of valve member 25 but small enough to insure proper operating engagement with thermo motor 100.

Temperature sensitive operation of valve member 25 is provided by thermostatic element or thermo motor 100. As most clearly seen in FIG. 1, thermo motor 100 is laterally positioned by a plurality of inwardly extending housing abutments 101 and 103. Axial positioning of thermo motor 100 is provided by adjusting screw 102 which threadably engages abutments 103 so that screw 102, which engages the end of wall 104, can be axially adjusted to vary the position of thermo motor 100 relative to the lower end of valve stem 60.

Figure 4:
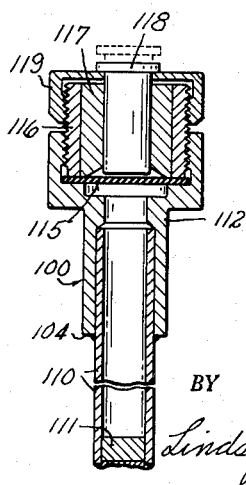
FIG. 4 is a vertical cross section view of a thermo motor usable with the valve of the preferred embodiment.

The construction of thermo motor 100 is best understood by referring to FIG. 4 wherein it is seen that sleeve 110, which is closed by plug 111 and which is secured to body 112, defines a chamber open at one end and which is filled with an expansible fluid. The upper end of the fluid chamber is closed by flexible diaphragm 115 whose peripheral edge is clamped to housing 112 by threaded coupling 116. Coupling 116 is generally cylindrical and acts as a guide for sliding movement of backing cylinder 117 relative thereto. Backing cylinder 117, in turn, guides operating rod or plunger 118 for axial sliding movement. Threaded cap 119 engages coupling 116 and is adjustable relative thereto to permit a varying amount of sliding movement of backing cylinder 117 relative to coupling 116.

The operation of thermo motor 100 is described first because of the extreme durability as well as reliability of operation that it provides. As is apparent from FIG. 4, the nature of the distortion of diaphragm 115 under the expansive force of the fluid is largely determined by the position of backing cylinder 117. If the backing cylinder 117 is incapable of axial movement because cap 119 has been rotated down on coupling 116, then the expansive fluid will immediately distort diaphragm 115 in the central region adjacent the base of operator 118 and thereby effect movement of operator 118 to the dotted line position with a comparatively small amount of fluid expansion (and therefore temperature rise). However, if threaded cap 119 has been positioned to permit considerable sliding movement of backing cylinder 117, it is seen that the edges of diaphragm 115 are permitted to distort, thereby decreasing the central distortion of diaphragm 115 so as to require greater expansion of the fluid before the diaphragm engages operator 118 to effect its movement to the dotted line position. The nature of this adjustability is such as to establish a permanent temperature operating point because of the fixed thermal conditions of the various thermo motor housing members. It is noted that backing cylinder 117 also reduces the chances of destructive distortion of diaphragm 115 under an extreme temperature condition.

The operation of the preferred embodiment of this valve is described separately for operation under conditions of overpressure and overtemperature because the valve provides independent operation under each of these conditions. Referring first to FIG. 1, it is seen that the fluid present in inlet passage 13 fills lower portion 11 of valve housing 10 as well as filling the central aperture 90 in valve stem 60 and all portions of pressure chamber 30. Assuming that main spring 40 has been adjusted to provide a downward force exceeding the upward force exerted on pressure chamber 30 by the fluid pressure and that the temperature is below that at which the thermostatic element has been adjusted to cause valve operation, it is seen that the fluid pressure exerted upon washer 28 and valve stem 60 is opposed by an identical fluid pressure exerted upon shoulder 65 of valve stem 60 and backing plate 66. Thus, if the areas of the members associated with valve stem 60 and valve member 25 that are exposed to fluid pressure are made equal, then the total fluid pressure force tending to move valve member 25 will be canceled and the only force which will maintain valve member 25 in sealing engagement with valve seat 22 will be the force of spring 80. Such a nullification of the upward pressure acting upon valve member 25 enables the force of main spring 40 to be applied to the pressure chamber 30 and absorbed by the housing 10 rather than being directed against valve member 25 so as to cause excessive wear upon valve seat 22 and frequent replacement of washer 28. Spring 80, of course, can be made quite light since it needs only sufficient force to cooperate with the thermo motor and to take care of slight unbalances in the aforementioned force nullification arrangement that may occur because of manufacturing tolerances.

Figure 2:
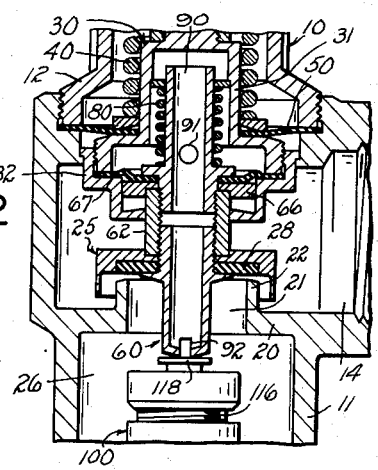
FIG. 2 is a partial vertical cross section view of the mechanism of FIG. 1.
Figure 3:
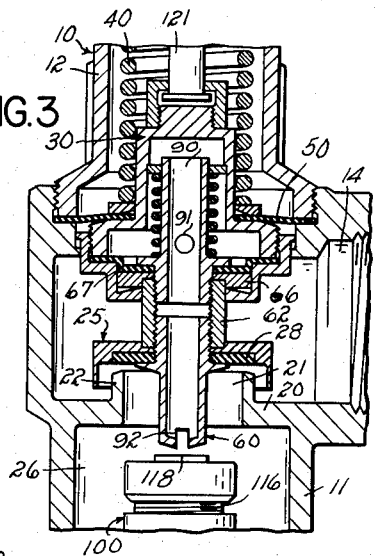
FIG. 3 is a partial vertical cross section view of the mechanism of FIG. 1.

The operation of the valve under an overtemperature condition is best seen by referring to FIG. 2 wherein valve operator 118 has been moved upwardly by the expansion of the fluid in thermo motor 100 and the accompanying distortion of diaphragm 115. This upward movement of operator 118 causes upward movement of the lower portion of valve stem 60 so that collar 62 and backing plate 66 slide relative to the sidewalls of pressure chamber 30. Diaphragm 67 distorts to permit this movement and spring 80 is compressed. Valve member 25 is thereby displaced from valve seat 22 to permit the escape of fluid through outlet passage 14. Valve member 25 will remain in the open position until the temperature of the fluid in inlet passage 13 returns to a safe or normal value as determined by thermo motor 100. At this time, the expansive fluid in thermo motor 100 will contract thereby permitting diaphragm 115 to assume its normal position so as to permit spring 80 to return valve member 25 and operator 118 of thermo motor 100 to the closed or normal position.

Upon occurrence of an overpressure condition, as predetermined by adjustment of the force exerted by main spring 40, it is seen that the pressure acts upwardly on upper housing 31 to compress main spring 40 thereby moving pressure chamber 30 upwardly until the inwardly extending abutment 72 on bottom 32 engages backing plate 66. Further upward movement of pressure chamber 30 is now accompanied by upward movement of valve stem 60 and therefore valve member 25 moves away from valve seat 22 to permit the fluid to escape through outlet passage 14. It is again noted that the cancellation of fluid pressure forces acting upon valve member 25 permits only the forces acting upon upper housing member 31 of pressure chamber 30 to be effective in opening the valve under an overpressure condition.

If steam is present in the valve inlet chamber 13, the valve member will be opened beyond the point determined by the just described pressure operation since valve member 25 presents a greater area to the steam when opened thereby causing an unbalance of forces which will move valve member 25 and valve stem 60 relative to pressure chamber 30 to permit even wider opening of valve member 25 relative to valve seat 22.

Manual opening of valve member 25 is obtained by lifting lever 120 so as to move rod 121 away from valve seat 22. Enlarged end 122 on rod 121 engages lip 123 on coupling 124 to move pressure chamber 30 in an upward direction. As described for overpressure operation, abutment 72 engages backing plate 66 to lift valve member 25 away from valve seat 22 as pressure chamber 30 is moved in an upward direction.

The mechanism of the instant invention also provides for washer and valve seat wear compensation since, under normal conditions, backing plate 66 is displaced from lip 72 (see FIG. 1). The amount of this displacement represents additional travel towards seat 22 available to valve member 25 under the force of spring 80 should washer 28 or valve member 22 change dimensions because of wear.

It is therefore seen that this invention provides a unique valve that is independently sensitive to pressure and temperature and that enables main valve operating spring force to be exerted upon the housing rather than upon the valve seat and washer. It is further seen that this invention provides a unique thermo motor that is extremely rugged and easily adjustable while being extremely sensitive to temperature change so as to produce a high force output.

As will be apparent to persons skilled in the art, various modifications and adaptations of the structure above described will become readily apparent without departure from the spirit and scope of the invention, the scope of which is defined in the appended claims.

I claim:

1. An automatic valve comprising a housing having fluid inlet and outlet passages, a valve seat member in said housing disposed intermediate the inlet and outlet passages, a valve member arranged to engage said valve seat member to close the valve, a pressure chamber disposed on the outlet side of said valve member, means supporting said pressure chamber for limited movement relative to the housing, said valve member being mounted for movement relative to said valve seat member and to said pressure chamber, means communicating between the inlet side of said valve member and said pressure chamber to effect movement of said pressure chamber in one direction in response to inlet pressure, and connection means between said valve member and said pressure chamber operable to move said valve member away from said valve seat member upon movement of said pressure chamber in said one direction.

2. An automatic valve comprising a housing having fluid inlet and outlet passages, a valve seat member in said housing disposed intermediate said inlet and outlet passages, a valve member arranged to engage said valve seat member to close the valve, a pressure chamber disposed on the outlet side of said valve member, means on said housing for supporting said pressure chamber for limited movement relative thereto, a valve stem operatively connected to said valve member and extending into said pressure chamber, said valve member and said valve stem connected thereto being mounted for movement relative to said valve seat member and to said pressure chamber, means supporting said valve stem for upward movement with said pressure chamber, a pressure seal between said stem and said pressure chamber, and means communicating between the fluid inlet passage and said pressure chamber thereby to exert an upward force on said pressure chamber in accordance with the pressure in the inlet passage and to apply a pressure force to said valve stem tending to close the valve.

3. The automatic valve as set forth in claim 2 wherein the area of the valve member exposed to inlet pressure when in engagement with said valve seat member is substantially equal to the area of said valve stem exposed to pressure tending to close said valve thereby to substantially balance the forces on said valve member as a result of fluid pressure.

4. An automatic valve comprising a housing having fluid inlet and outlet passageways, an apertured wall in said housing disposed intermediate the inlet and outlet passages and providing a valve seat on the outlet side thereof, a valve member dimensioned to effect sealing engagement with the valve seat on said apertured wall, a pressure chamber disposed on the outlet side of said apertured wall, means mounting said pressure chamber on said housing for limited movement toward and away from said apertured wall, a first spring disposed intermediate said housing and said pressure chamber to urge said pressure chamber towards said apertured wall, a stem secured to said valve member and extending into said pressure chamber, said stem being mounted on said pressure chamber for limited movement relative thereto, a pressure seal between said stem and said pressure chamber, said stem and said pressure chamber being arranged to cause movement of said stem and said valve member away from said aperture with movement of said pressure chamber away from said aperture in excess of said limited movement permitted between said stem and said pressure chamber, means communicating from the inlet side of said valve member to the interior of said pressure chamber thereby to exert a force on said valve stem opposing the force exerted on said valve member by said fluid pressure and to effect upward movement of said pressure chamber upon an occurrence of a predetermined inlet pressure, and a spring operable between said valve stem and said pressure chamber to urge said valve member towards said apertured wall.

5. The automatic valve as set forth in claim 4 wherein the area of said valve stem exposed to pressure tending to force the valve stem towards the apertured wall is substantially equal to the area of the valve member exposed to fluid pressure.

6. An automatic valve as set forth in claim 4 wherein said means communicating between the inlet side of said valve member and said pressure chamber comprises a passageway in said valve stem.

7. An automatic valve comprising a housing having fluid inlet and outlet passages, an apertured wall extending across said housing between said inlet and outlet passages and having a valve seat formed thereon disposed about said aperture, a valve member arranged to engage the valve seat to close the valve, a pressure chamber disposed on the outlet side of said valve member and having a radially extending rim formed thereon, an annular groove on said housing arranged to engage the annular rim on said pressure chamber thereby to support said pressure chamber for limited movement relative thereto, a spring operatively disposed between said housing and said pressure chamber to urge said pressure chamber towards said apertured wall until said rim engages the lower edge of said groove, a hollow valve stem secured to said valve member and having one end extending through said valve member and its other end extending into said pressure chamber thereby to communicate the fluid pressure on the inlet side of said valve member with said pressure chamber, and said valve stem and said pressure chamber being mounted to permit limited relative movement therebetween, and a pressure seal between said valve stem and said pressure chamber.

8. A fluid pressure responsive valve comprising a housing having fluid inlet and outlet passages, a valve seat member in said housing disposed intermediate the inlet and outlet passages, a valve member arranged to engage said valve seat member to close said valve, a pressure chamber disposed on the outlet side of said valve member, means supporting said pressure chamber on said housing for movement relative thereto between upper and lower limits, means urging said pressure chamber towards the lower limit, the force of said last named means acting upon said pressure chamber at the lower limit of movement being absorbed by said housing, a valve stem operatively connected to said valve member and extending into said pressure chamber, said valve stem being mounted for upward movement with said pressure chamber and movement relative to said pressure chamber, a pressure seal between said valve stem and said pressure chamber, and means communicating between the inlet side of said valve member and said pressure chamber thereby to exert an upward force on said pressure chamber in accordance with inlet pressure and to apply a pressure force to said valve stem opposing the fluid pressure force on said valve member.

9. The fluid pressure responsive valve as set forth in claim 8 wherein said means communicating between the inlet side of said valve member and said pressure chamber comprises a passageway in said valve stem.

10. An automatic valve comprising a housing having fluid inlet and outlet passageways, a valve seat member in said housing disposed intermediate the inlet and outlet passageways, a valve member arranged to engage said valve seat member to close the valve, a pressure chamber disposed on the outlet side of said valve member, a valve stem attached to said valve member and extending into said pressure chamber, said valve stem being mounted for limited movement relative to said pressure chamber, a pressure seal between said valve stem and said pressure chamber, an axial aperture in said valve stem extending from the inlet side of said valve member to the interior of said pressure chamber thereby to exert a fluid pressure force on said valve stem opposing the fluid pressure force exerted on the inlet side of said valve member, and a thermo motor mounted in said housing on the inlet side of said valve member and contacting the same when said valve seat member is engaged by said valve member, said thermo motor being operative to move when heated toward said valve seat member to effect movement of said valve stem relative to said pressure chamber away from said valve seat member to open the valve, and to move when cooled away from said valve seat member to permit movement of said valve stem relative to said pressure chamber toward said valve seat member to close the valve.

11. An automatic valve comprising a housing having fluid inlet and outlet passages, a valve seat member in said housing disposed intermediate the inlet and outlet passages, a valve member arranged to engage said valve seat member to close the valve, a pressure chamber supported by said housing on the outlet side of said valve member, a valve operator attached to said valve member and extending into said pressure chamber, said valve operator being mounted for movement relative to said pressure chamber, a pressure seal between said valve operator and said pressure chamber, means communicating between the inlet side of said valve member and said pressure chamber thereby to exert a fluid pressure force on said valve operator tending to cancel the fluid pressure force exerted upon the inlet side of said valve member, a spring operatively disposed between said housing and said valve member to urge said valve member into engagement with said valve seat member, and a thermo motor mounted in said housing on the inlet side of said valve member and engageable therewith, said thermo motor being movable under the influences of temperature changes toward and away from said valve seat member to effect movement of said valve member relative to said pressure chamber away from and toward said valve seat member to open and close the valve in accordance with fluid temperature.

12. The automatic valve as set forth in claim 11 wherein the means communicating between the inlet side of said valve member and said pressure chamber comprises a passageway extending from the inlet side of said valve member through said valve operator to said pressure chamber.

References Cited in the file of this patent
UNITED STATES PATENTS

| | | |
|---|---|---|
| 2,310,519 | Eskin | Feb. 9, 1943 |
| 2,490,219 | Kmiecik | Dec. 6, 1949 |
| 2,497,201 | Banner | Feb. 14, 1950 |
| 2,507,466 | De Craene | May 9, 1950 |
| 2,557,536 | Drane et al. | June 19, 1951 |
| 2,614,580 | Cormier | Oct. 21, 1952 |
| 2,733,729 | Wolfe | Feb. 7, 1956 |
| 2,756,936 | Mueller et al. | July 31, 1956 |